US008212712B2

(12) United States Patent
Bon et al.

(10) Patent No.: US 8,212,712 B2
(45) Date of Patent: Jul. 3, 2012

(54) METHOD OF PROCESSING A RADAR IMAGE, OBTAINED IN PARTICULAR FROM AN AIRBORNE RADAR, WITH EVALUATION OF THE ALTITUDE OF THE 0° C. ISOTHERM

(75) Inventors: Nicolas Bon, Brest (FR); Jean-Paul Artis, Plouzane (FR); Nicolas Raguenes, Ploudalmezeau (FR)

(73) Assignee: Thales (FR)

( * ) Notice: Subject to any disclaimer, the term of this patent is extended or adjusted under 35 U.S.C. 154(b) by 17 days.

(21) Appl. No.: 12/358,524

(22) Filed: Jan. 23, 2009

(65) Prior Publication Data
US 2009/0243917 A1 Oct. 1, 2009

(30) Foreign Application Priority Data
Jan. 23, 2008 (FR) .................................... 08 00349

(51) Int. Cl.
*G01S 13/95* (2006.01)
(52) U.S. Cl. ...................... 342/26 R; 342/26 B
(58) Field of Classification Search ............... 342/26 R
See application file for complete search history.

(56) References Cited

U.S. PATENT DOCUMENTS

| | | | |
|---|---|---|---|
| 6,201,494 B1 | 3/2001 | Kronfeld | |
| 6,424,288 B1 * | 7/2002 | Woodell | 342/26 R |
| 6,615,140 B2 * | 9/2003 | White et al. | 702/3 |
| 6,741,203 B1 | 5/2004 | Woodell | |
| 7,109,913 B1 * | 9/2006 | Paramore et al. | 342/26 B |
| 7,307,577 B1 * | 12/2007 | Kronfeld et al. | 342/26 B |
| 7,417,577 B2 * | 8/2008 | Testud et al. | 342/26 R |
| 7,486,220 B1 * | 2/2009 | Kronfeld et al. | 342/26 B |
| 7,492,304 B1 * | 2/2009 | Woodell et al. | 342/26 B |
| 7,541,971 B1 * | 6/2009 | Woodell et al. | 342/173 |
| 7,714,767 B1 * | 5/2010 | Kronfeld et al. | 342/26 B |

OTHER PUBLICATIONS

Baldini, L. et al. "Characteristics of the Melting Layer in the Mediterranean Region From Dual Polarization Radar Measurements at Vertical Incidence." Geoscience and Remote Sensing Symposium, 2005. Igarss '05, Proceedings, 2005 IEEE International Seoul, Korea Jul. 25-29, 2005, Piscataway, NJ, USA, IEEE, vol. 6, Jul. 25, 2005, pp. 4138-4141, XP010848698, ISBN: 978-0-7803-9050-8.
Bandera, J. et al. "Method for Detecting the Extent of the Melting Layer." Electronics Letters, IEE Stevenage, GB, vol. 34, No. 22, Oct. 29, 1998, pp. 2104-2105, XP006101504, ISSN: 0013-5194.
Nor, Hisham Haji Khamis et al. "Determination of the Melting Layer from Meteorological Radar Data in Malaysia." Microwave, Antenna, Propagation and EMC Technologies for Wireless Communications, 2007 International Symposium on IEEE, PI, Aug. 1, 2007, pp. 1467-1470, XP031167646, ISBN: 978-1-4244-1044-6.
Tan, J. et al. "The Use of Dual-Polarisation Techniques for Bright-Band Detection with PPI-Based Radars." Jan. 1, 1995, pp. 11/1-11/6, XP006529088.

* cited by examiner

*Primary Examiner* — Thomas Tarcza
*Assistant Examiner* — Matthew M Barker
(74) *Attorney, Agent, or Firm* — Lowe Hauptman Ham & Berner, LLP

(57) ABSTRACT

The invention targets a method of processing a radar image obtained from a radar. It comprises an automatic evaluation of the altitude of the isotherm at zero degrees Celsius, called zero isotherm, using a processing of the reflectivity information (rf(px)) conveyed by pixels (px) forming all or part of the radar image.

17 Claims, 10 Drawing Sheets

METHOD OF PROCESSING A RADAR IMAGE, OBTAINED IN PARTICULAR FROM AN AIRBORNE RADAR, WITH EVALUATION OF THE ALTITUDE OF THE 0° C. ISOTHERM

RELATED APPLICATIONS

The present application is based on, and claims priority from, French Application Number 08 00349, filed Jan. 23, 2008, the disclosure of which is hereby incorporated by reference herein in its entirety.

TECHNICAL FIELD

The invention relates to the detection of the altitude of the isotherm at zero degrees Celsius, or zero isotherm, in particular on board a carrier (for example, an airplane), in order notably to inform the pilot or any other person navigating on board the carrier thereof.

BACKGROUND OF THE INVENTION

The altitude of the zero isotherm corresponds to the boundary between the liquid phase and the solid phase of the atmospheric water. When a frozen hydrometeor (that is, a particle of water, in this case frozen) passes through this boundary, it starts to progressively melt.

It is particularly important for a pilot to know where the zero isotherm is located. This is because the risks need to be understood differently depending on whether the liquid or frozen phase applies, because the risks that are run are not the same. Moreover, the processing operations performed on the data also depend on the phase.

It should be noted that, beyond the zero isotherm, the dielectric properties of the hydrometeor are modified, as is its reflectivity. It will be recalled that, for a given point, the reflectivity corresponds to the ratio of the energy reflected by this point to the total incident energy.

This rise in reflectivity is translated into the appearance of a bright strip in high-resolution radar images. However, radars on board carriers have a resolution that is too low for it always to be possible to view this bright strip.

One known solution for determining the zero isotherm is to use temperature sensors, on board the carrier (U.S. Pat. No. 6,741,203 and U.S. Pat. No. 6,201,494) associated with a temperature decrease model and a measurement of the altitude of the carrier. However, the use of a temperature indication gives imprecise results. For example, the measurements can be very sensitive to the degree of humidity of the atmosphere.

Moreover, this solution is applicable only in relatively low latitude regions for which the altitude of the carrier is situated under the tropopause. Indeed, a reversal of the trend of the temperature is observed beyond this boundary: the model used is therefore no longer valid.

Other methods involve using data transmitted by sources external to the carrier: for example, weather bulletins transmitted by ground or other stations (U.S. Pat. No. 6,424,288). However, the transmission of the information is not always possible to fleet airplanes.

SUMMARY OF THE INVENTION

The invention aims notably to provide a solution to these problems.

One aim of the invention is to propose a method enabling an accurate evaluation of the altitude of the isotherm at zero degrees Celsius.

Another aim of the invention is to enable this evaluation to be performed on board a carrier in flight.

Another aim of the invention is to propose a method enabling a robust evaluation of the altitude of the isotherm at zero degrees Celsius.

To this end, according to a first aspect, there is proposed a method of processing a radar image, in particular obtained from an airborne radar.

According to a general characteristic, the method comprises an automatic evaluation of the altitude of the isotherm at zero degrees Celsius, called zero isotherm, using a processing of the reflectivity information conveyed by pixels forming all or part of the radar image.

In other words, the reflectivity information of the radar image or of a part of the radar image is used to determine the altitude of the zero isotherm.

The detection of the altitude of the zero isotherm therefore results from processing of information and not from a simple observation of a bright strip.

Thus, even if the bright strip indicative of the altitude of the zero isotherm is not visible, the altitude of the zero isotherm can be evaluated from the processing of the reflectivity information.

Moreover, the evaluation is done automatically, for example each time a new radar image is acquired.

According to one embodiment, the processing can comprise a generation of at least two intermediate values of the altitude of the zero isotherm, from variations in the reflectivity information within the radar image, the value of the altitude of the zero isotherm being a function of the intermediate values.

Each radar image has N vertical slices, and the processing of the information can be performed on each vertical slice, one after the other. More specifically, the processing of the information is performed continuously over a series of vertical slices, without distinction. It will be noted that the term "radar image" should be understood to mean the volume scanned by the beam from the radar antenna, on each acquisition, the N vertical slices forming this volume.

According to one embodiment, the processing of the information can comprise:

for each vertical slice of the radar image, the application of at least two distinct methods so as to obtain at least two intermediate values of the altitude of the zero isotherm, a generation, for each method and for all the vertical slices, of at least one main intermediate value of the altitude of the zero isotherm, from a selected set of intermediate values of the altitude of the zero isotherm, the value of the altitude of the zero isotherm being evaluated from the main intermediate values of the altitude of the zero isotherm.

Preferably, at least three main intermediate values of the altitude of the zero isotherm are determined, at least two main intermediate values out of all the main intermediate values are combined, the standard deviation of each combination is calculated, the combination with the lowest standard deviation is selected, and if the standard deviation of the selected combination is less than a given threshold, the altitude of the zero isotherm is determined by calculating an average of the main intermediate values of the selected combination.

Preferably, the method can also comprise, for each vertical slice of the radar image, a search for so-called areas of interest formed by pixels conveying reflectivity information, the value of which is greater than a given threshold, the processing of the information being performed on the areas of interest of the vertical slices.

For example, a first method can comprise, for each vertical slice:

- a step for calculating the average altitude of each upper boundary of each area of interest of the vertical slice concerned,
- a generation of a first intermediate value of the altitude of the zero isotherm, by calculating a weighted average of the calculated average altitudes, the weighting being a function of the distance of the area of interest concerned from the radar.

For example, a second method can comprise, for each vertical slice:

- a determination of a histogram representing the number of pixels of the vertical slice concerned for each reflectivity value,
- a determination of two peaks corresponding to two maxima of numbers of pixels for two distinct reflectivity values,
- a location of a minimum of pixels between the two determined peaks,
- a binary conversion of the reflectivity information of the pixels of the vertical slice, as a function of the value of the located minimum,
- a storage of the pixels belonging to the boundary between the two areas of the vertical slice concerned,
- a deletion of the stored pixels that are too distant from the areas of interest,
- a determination of the ranges of pixels formed by a number of consecutive pixels greater than a given threshold,
- a generation of a second intermediate value of the altitude of the zero isotherm, corresponding to an average of the altitude of the pixels of the determined ranges while applying a linear weighting to the altitudes of the pixels, as a function of the distance of the pixel concerned relative to the radar, and
- a validation of the second intermediate value of the altitude of the zero isotherm, if the total number of pixels out of all the ranges is greater than a given threshold.

For example, a third method can comprise, for each vertical slice:

- a deletion of the pixels with a reflectivity value that belongs to a chosen interval, the other pixels being considered to be valid,
- a deletion of the columns of pixels that have a number of valid pixels less than a given threshold,
- a determination of an average reflectivity profile of the vertical slice concerned, the profile representing, for each row of valid pixels, an average of the reflectivity values of the pixels of the row,
- a search for a third intermediate value of the altitude of the zero isotherm, corresponding to the altitude of the pixel located on a reflectivity peak,
- another search for another intermediate value of the altitude of the zero isotherm, called intermediate value 3a, corresponding to the altitude of the pixel situated at the position of the strongest reflectivity gradient.

For example, a fourth method can comprise, for each vertical slice:

- a selection of the pixels with a reflectivity information value that belongs to a chosen interval,
- for each column of the vertical slice concerned, a search for the altitude of a maximum reflectivity gradient and a storage of the pixels situated at the altitude of the gradient,
- a deletion of the stored pixels that are too distant from the areas of interest,
- a determination of ranges of pixels, each range being formed by a number of consecutive pixels greater than a given threshold,
- a calculation of a fourth intermediate value of the altitude of the zero isotherm, corresponding to an average of the altitude of the pixels of the ranges determined by calculating a linear weighting on the altitudes of the pixels, as a function of the distance of the pixel concerned relative to the radar, and
- a validation of the value of the fourth intermediate value of the altitude of the zero isotherm, if the total number of pixels out of all the ranges is greater than a given threshold.

For example, a fifth method can comprise, for each vertical slice:

- a deletion of the pixels that are too distant from the areas of interest,
- a deletion of the pixels with a reflectivity value that does not belong to a chosen interval,
- for each remaining pixel, a calculation of the variance of the associated reflectivity value,
- a retention of the variance values that are greater than a given threshold,
- a calculation of a fifth intermediate value of the altitude of the zero isotherm, corresponding to an average of the altitude of the selected pixels, by applying a linear weighting to the altitudes of the pixels, as a function of the distance of the pixel concerned relative to the radar, and
- a validation of the value of the fifth intermediate value of the altitude of the zero isotherm, if the total number of pixels selected is greater than a given threshold.

The application of several methods for determining a certain number of intermediate values of the zero altitude, values from which the zero altitude itself is determined, renders the detection of the altitude of the zero isotherm relatively robust.

According to another aspect, there is proposed a system for processing an image obtained from a radar, capable of implementing a method as described hereinabove.

For example, the radar can be airborne.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
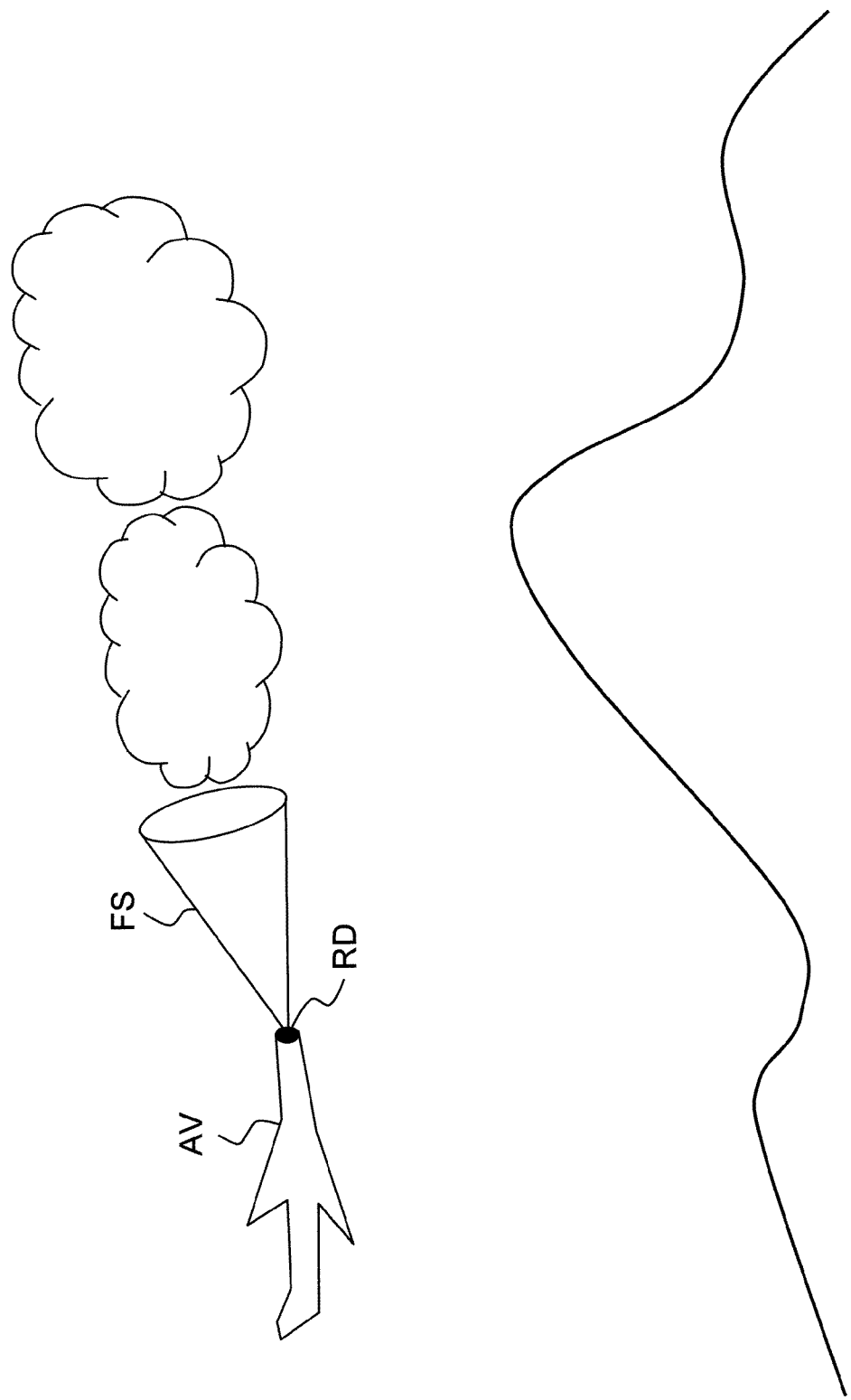
FIG. 1 illustrates a carrier provided with a radar within which a method according to the invention is implemented.

Reference should be made to FIG. 1 which schematically illustrates an airplane AV provided with a radar RD. In this example, an airborne radar is considered, but the invention can be applied to any type of radar: airborne or on the ground.

The radar RD emits a signal in the form of a beam FS, so as to determine the position and the quality of the hydrometeors targeted by the radar beam FS.

Figure 2:
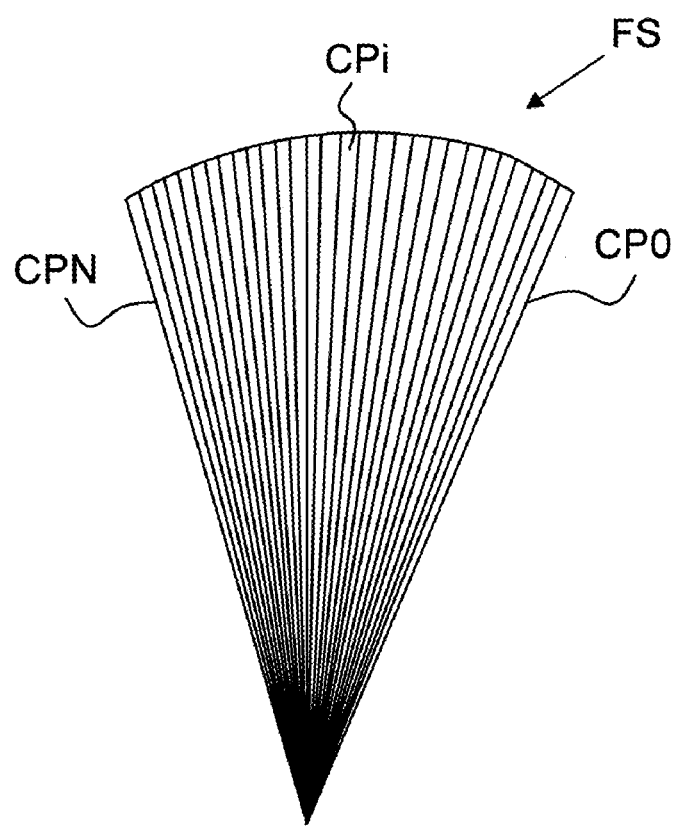
FIG. 2 represents the beam from a radar in more detail.

FIG. 2 represents the beam FS, seen from above, in greater detail. The latter is formed by N vertical slices referenced CP0 . . . CPi . . . CPN.

Figure 3:
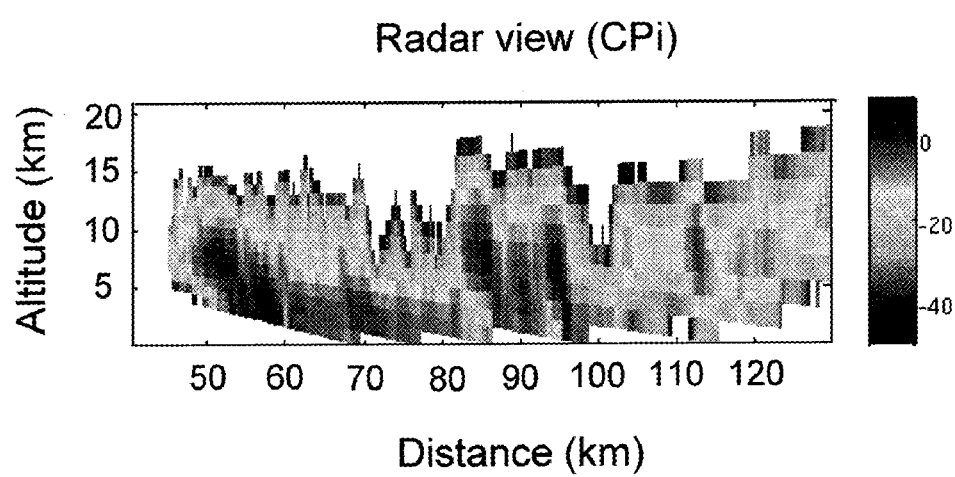
FIG. 3 represents an exemplary vertical slice of a radar image.

An exemplary vertical slice CPi (or radar view) is represented in FIG. 3. More specifically, a radar view has in representing the reflectivity of each area targeted by the radar beam FS as a function of the spatial coordinates, the altitude and the distance relative to the radar.

The value of the reflectivity (or reflectivity information) corresponds to the amplitude associated with the pixel. The higher the altitude, the greater the reflectivity value, and vice versa. In other words, the darkest areas of the radar view signal the areas that have a high reflectivity value. In reality, the radar views are coloured: the dark grey areas are red, the mid-grey areas are yellow-orange and the light grey areas are green.

Figure 4:
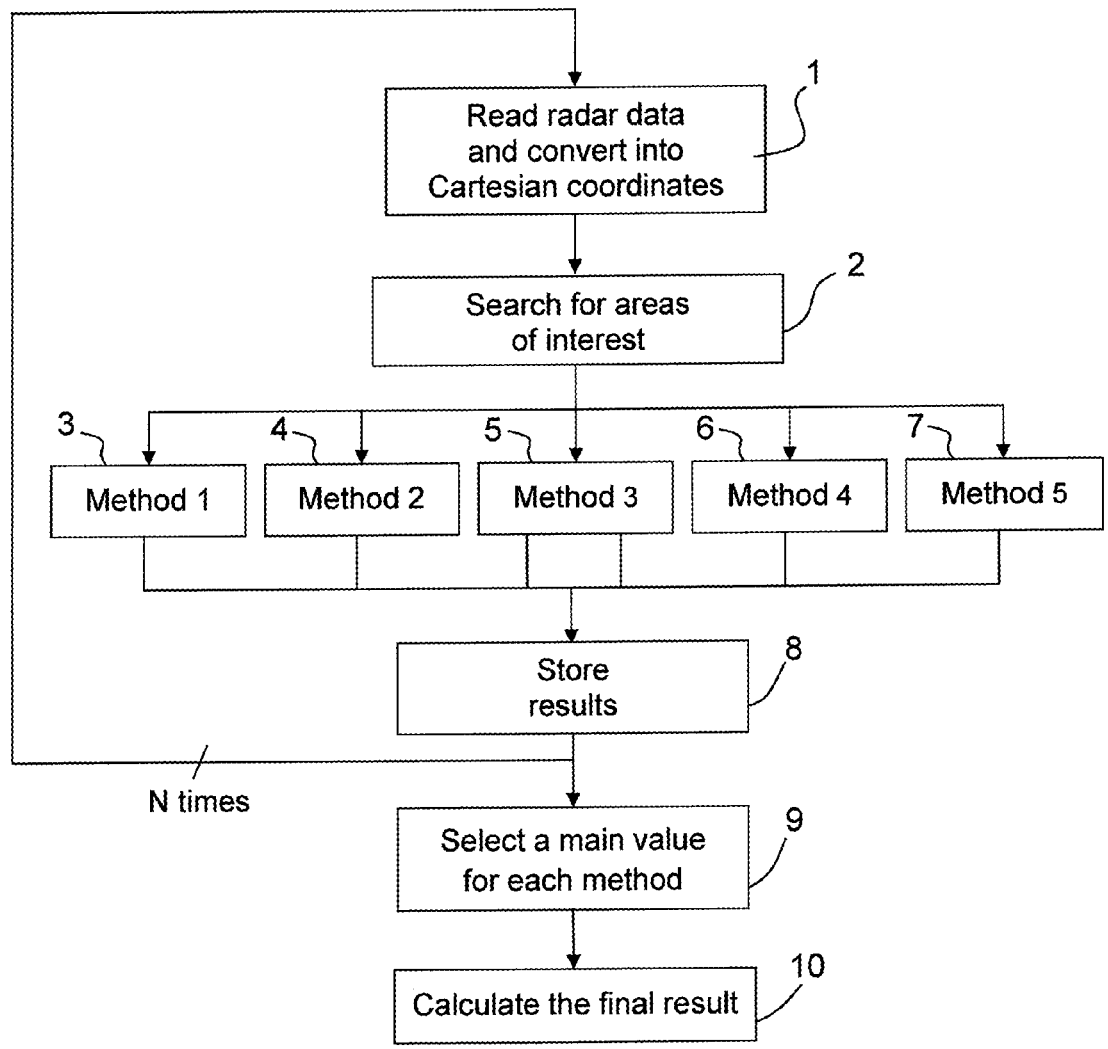
FIG. 4 illustrates an embodiment of a method according to the invention.

Reference is now made to FIG. 4. The flow diagram represented therein reviews the various steps of an embodiment of a method according to the invention. Preferably, this embodiment is implemented by software.

In this example, the steps 1 to 8 described hereinbelow are applied to each vertical slice CPi of a radar image.

In a first step 1, the data transmitted by the radar RD on board the carrier AV concerned are read, these data then being directly converted into Cartesian coordinates.

So as to improve the process, areas of interest are then detected in a step 2. These correspond to parts of the radar image where it is a priori easier to evaluate the altitude of the zero isotherm. This step provides a way of shortening the calculation time, and obtaining a more accurate result.

The processing of the reflectivity information of the vertical slice concerned is then performed. This processing comprises in this example the application of five distinct methods, steps 3, 4, 5, 6 and 7, to each of the vertical slices.

For each vertical slice, at least one intermediate value of the altitude of the isotherm at zero degrees Celsius, hereinafter called zero isotherm, is obtained. In this example, the methods 1, 2, 4 and 5 deliver an intermediate value of the altitude of the zero isotherm, whereas the method 3 delivers two thereof, by being based on two distinct criteria, as explained in more detail hereinbelow.

The number of methods and the method used are in no way limiting. Those skilled in the art will be able to use the appropriate number of methods according to the accuracy sought and the desired calculation speed.

Each of these methods is capable of exploiting the reflectivity information of the vertical slice being processed so as to deduce therefrom an intermediate value of the altitude of the zero isotherm.

These intermediate values of the zero altitude are then stored, step 8.

Once the steps 1 to 8 have been completed for the N vertical slices, a main intermediate value is selected for each method, step 9, or even two main intermediate values for one of the methods. Then, from the main intermediate values of the altitude of the zero isotherm, the value of the altitude of the zero isotherm is finally evaluated, step 10.

Figure 5:
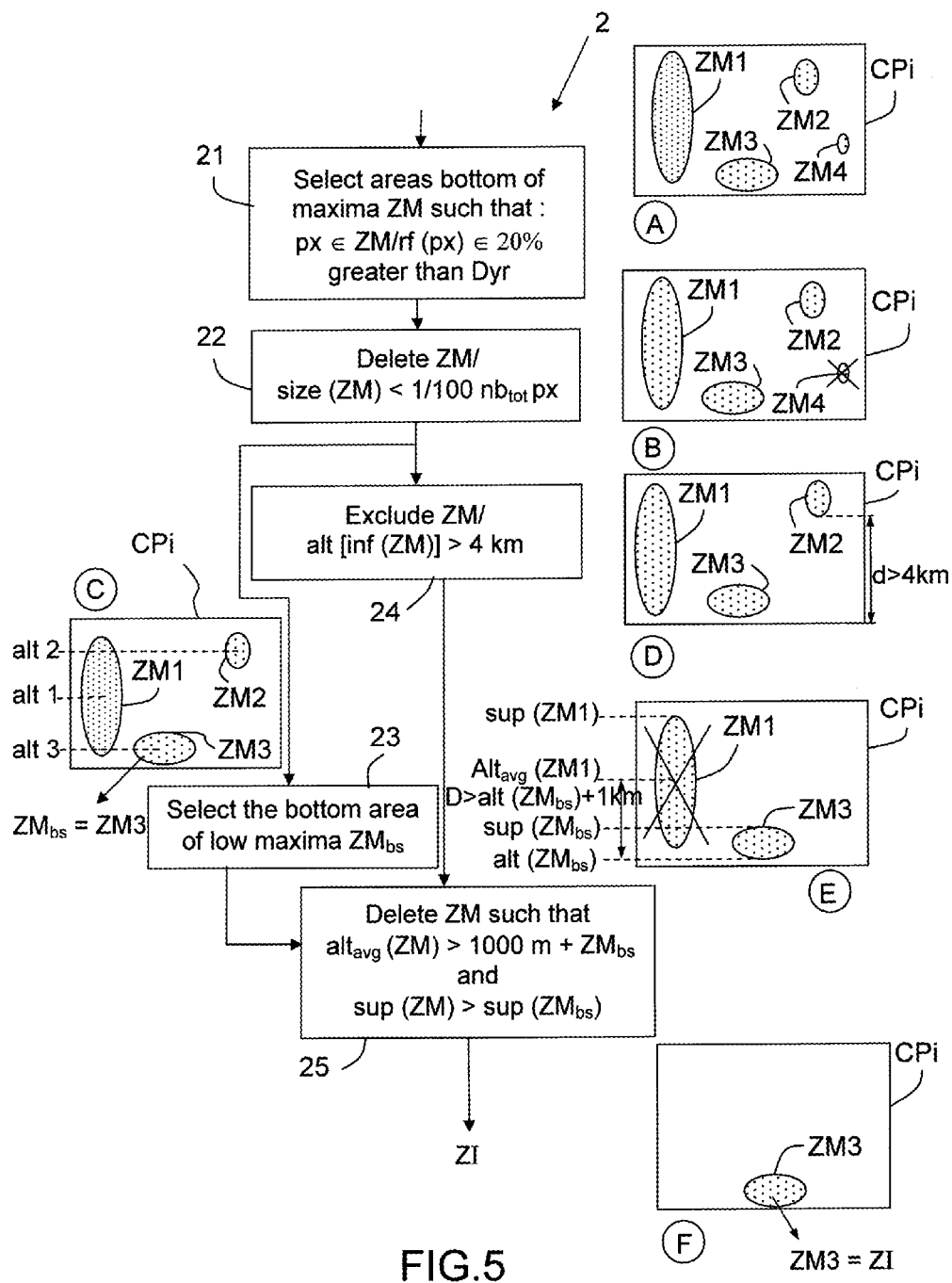
FIG. 5 illustrates more precisely an exemplary embodiment of a step for searching for areas of interest.

FIG. 5 illustrates the step 2 in more detail, in other words the step for searching for areas of interest.

The latter first comprises a step 21 for selecting areas of maxima ZM, that is, the pixels px such that their reflectivity value rf(px) belongs to the top 20% of the reflectivity dynamic range Dyr. The expression "reflectivity dynamic range" should be understood to mean the range of the reflectivity values taken by the pixels of the vertical slice being processed. This range is delimited by the minimum and maximum reflectivity values that are found within the vertical slice being processed.

An Example A of vertical slice CPi is represented. On this slice, the grey areas represent the areas of maxima ZM1, ZM2, ZM3 and ZM4 selected on the slice, according to the abovementioned criterion.

Then, the areas of maxima that have a size called size (ZM), less than a given threshold, are deleted, step 22. Here, the threshold is a hundredth of the total number of pixels of the vertical slice concerned.

The Example B illustrates the deletion of the area ZM4 whose size is less than the set threshold.

From the remaining areas of maxima ZMi, an area of maxima called bottom area of maxima, $ZM_{bs}$, is selected, step 23. This area is the one with the lowest average altitude (that is, the average of the altitudes of the pixels that form the area concerned). In the Example C, the bottom area of maxima $ZM_{bs}$ is the area ZM3. This area $ZM_{bs}$ serves as a reference thereafter.

In parallel, again on completion of the deletion of the areas of maxima that have too small a size, step 22, the areas of maxima ZM for which the altitude of the bottom limit alt[inf (ZM)] is less than a given threshold, in this case 4 km, are excluded, step 24. In other words, the areas of maxima situated at too high an altitude are deleted. In effect, the altitude of the zero isotherm is located in a band of altitude close to the ground, between 0 and 4 km. The application of this criterion leads to the deletion of the area ZM2, example D.

Finally, the areas of maxima ZM with an average altitude $alt_{avg}$ (that is, the average of the altitudes of the pixels forming the area concerned) that is greater than a certain threshold dependent on the altitude of the bottom area of maxima, $ZM_{bs}$, and whose upper limit is greater than that of the bottom area of maxima $ZM_{bs}$, are deleted, step 25. In this example, the areas of maxima with an average altitude greater than that of the bottom area of maxima $ZM_{bs}$ to which 1000 m has been added are deleted.

As illustrated in the example E, this in this case leads to the deletion of the area of maxima ZM1.

The remaining areas of maxima then form the areas of interest ZI. In this example, only the area ZM3 is an area of interest, as represented in the example F.

The areas of interest ZI correspond either to precipitation areas, or to a bright strip signalling the location of the zero isotherm.

FIGS. 6 to 13 describe different methods of determining intermediate values of the altitude of the zero isotherm. As indicated hereinabove, the choice of the number and of the type of methods can be adapted by those skilled in the art according to the chosen application.

Figure 6:
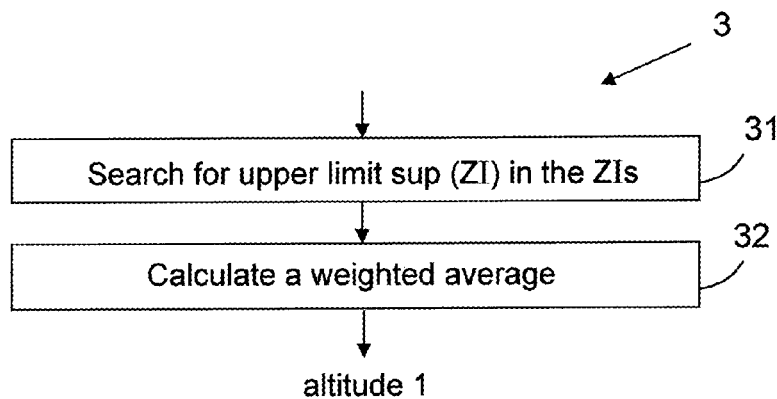
FIG. 6 illustrates an exemplary embodiment of a first method of obtaining intermediate values of the altitude of the zero isotherm.

The method illustrated in FIG. 6, method 1, comprises two steps. A first step 31 comprises a search for the upper limit of each area of interest ZI determined in the preceding step, in other words, the topmost pixels of all the areas of interest retained. In effect, generally, the upper limit of the areas of interest ZI indicates a separation between the positive and negative temperatures.

Then, a weighted average of the altitudes found is calculated, step 32. The weighting is a function of the distance of the pixel relative to the radar. The latter makes it possible to mitigate the blurring effect due to the reduced resolution because of the distance to the radar.

On completion of the method 1, a first intermediate value of the altitude of the zero isotherm, altitude 1, is obtained.

Figure 7:
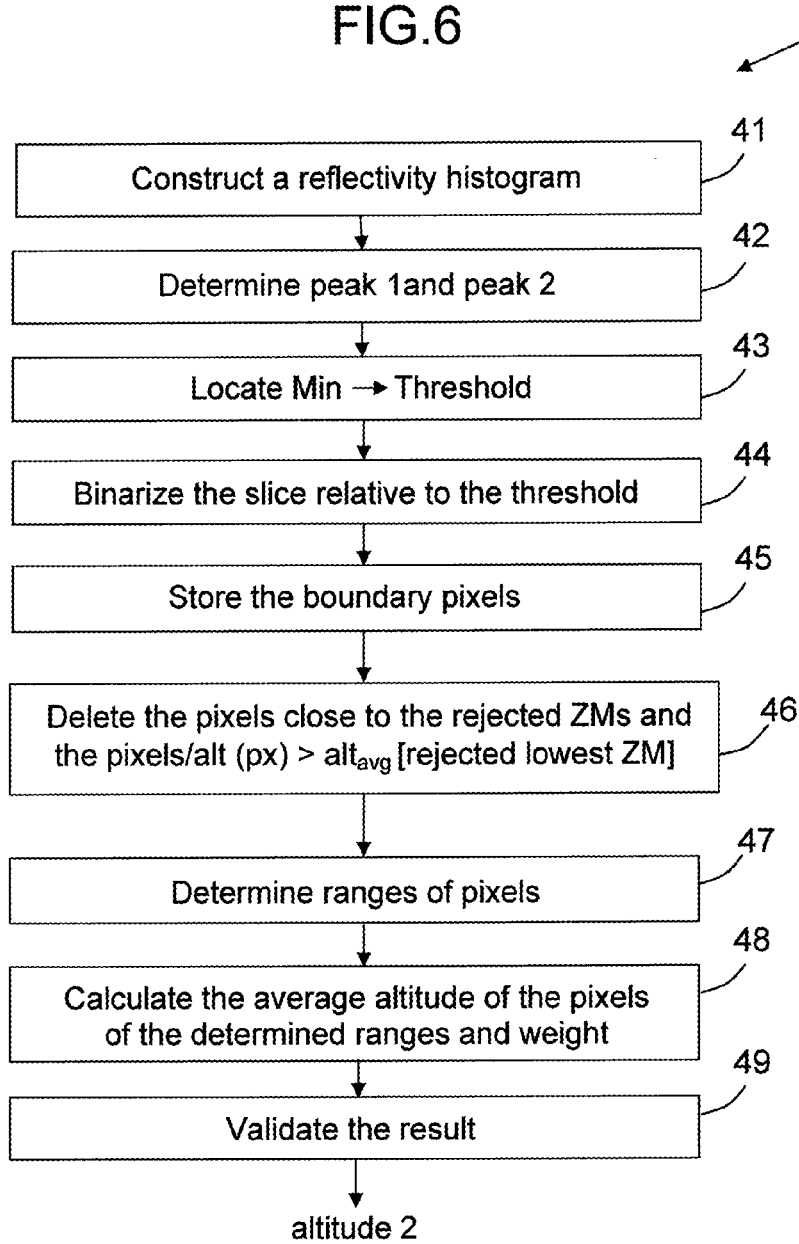
FIGS. 7 and 8 illustrate an exemplary embodiment of a second method of obtaining intermediate values of the altitude of the zero isotherm.

FIG. 7 illustrates the steps of another method, referenced method 2 in FIG. 4. This method is based on the analysis of the reflectivity histogram of the vertical slice concerned.

Figure 8:
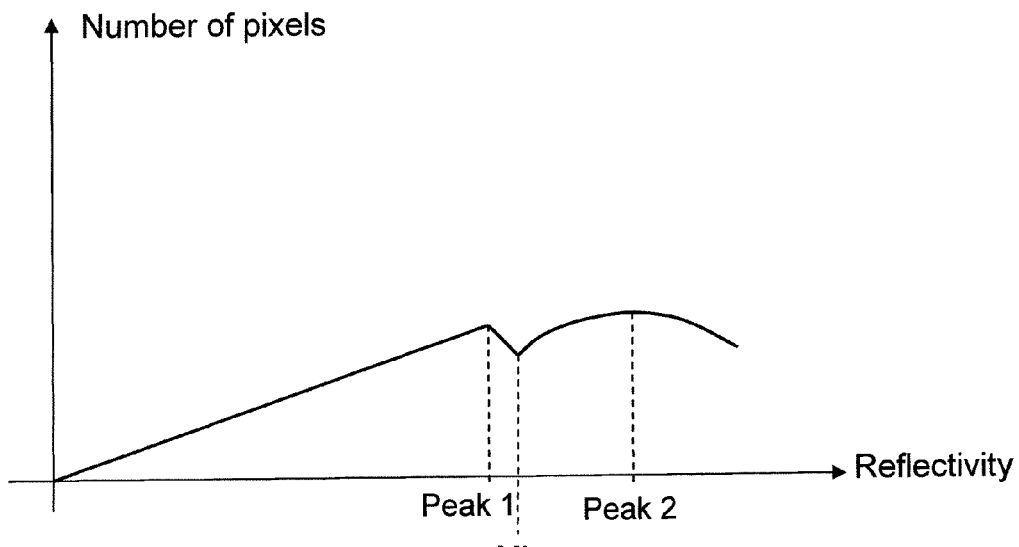

The histogram in question is constructed during a step 41. An exemplary histogram is represented in FIG. 8. The reflectivity histogram indicates the number of pixels of the vertical slice for each reflectivity value. One aim of this method is to detect an intermediate value of the altitude of the zero isotherm by delimiting, on the vertical slice concerned, two regions: the area of ice above the zero isotherm and the area of rain below. The zero isotherm constitutes the boundary between the two.

The histogram comprises two reflectivity peaks, referenced peak1 and peak2. Between these two peaks, there is a reflectivity minimum Min.

During a step 42 (FIG. 7), the position of the two peaks peak1 and peak2 is determined: these peaks are the two greatest overall maxima of the last third of the vertical slice concerned, that is, the part of the vertical slice that comprises the highest reflectivity values. These two peaks are effectively taken into account if they are sufficiently distant from each other, for example by $1/10$ th of the number of reflectivity values of the histogram.

The local minimum Min best separating the two determined peaks peak1 and peak2 is located, step 43. The reflectivity value associated with this minimum Min corresponds to the segmentation threshold, Threshold.

The vertical slice CPi is then binarized relative to the segmentation threshold, step 44. In other words:

$$CPi(x, y) = \begin{cases} 1 & \text{if } CPi(x, y) > \text{threshold} \\ 0 & \text{otherwise} \end{cases}$$

in which x and y are the Cartesian coordinates of the pixels within the vertical slice concerned.

The pixels belonging to the boundary between the two areas are located and stored, step 45.

The pixels situated above the lowest average altitude of the areas of maxima ZM rejected (on selecting the areas of interest, step 2), are deleted as are the pixels adjacent to the rejected areas of maxima, step 46.

Ranges of pixels, that is, a series of points that are regular and as horizontal as possible, are then determined, step 47. Each range must be long enough to be taken into account (for example, have a number of pixels greater than a certain threshold). Moreover, the ranges with an average altitude (average of the constituent pixels) dispersed by more than 1500 m are not retained. In this example, a range of pixels is defined by a series of consecutive pixels with an altitude dispersion less than 500 m.

Once the ranges of points have been determined, the average altitude of the retained pixels is calculated while applying a weighting as a function of the distance of the pixel relative to the radar, step 48.

The result is validated if the number of pixels is sufficient, step 49.

On completion of the step 49, a second intermediate value of the altitude of the zero isotherm, referenced altitude 2, is obtained.

Figure 9:
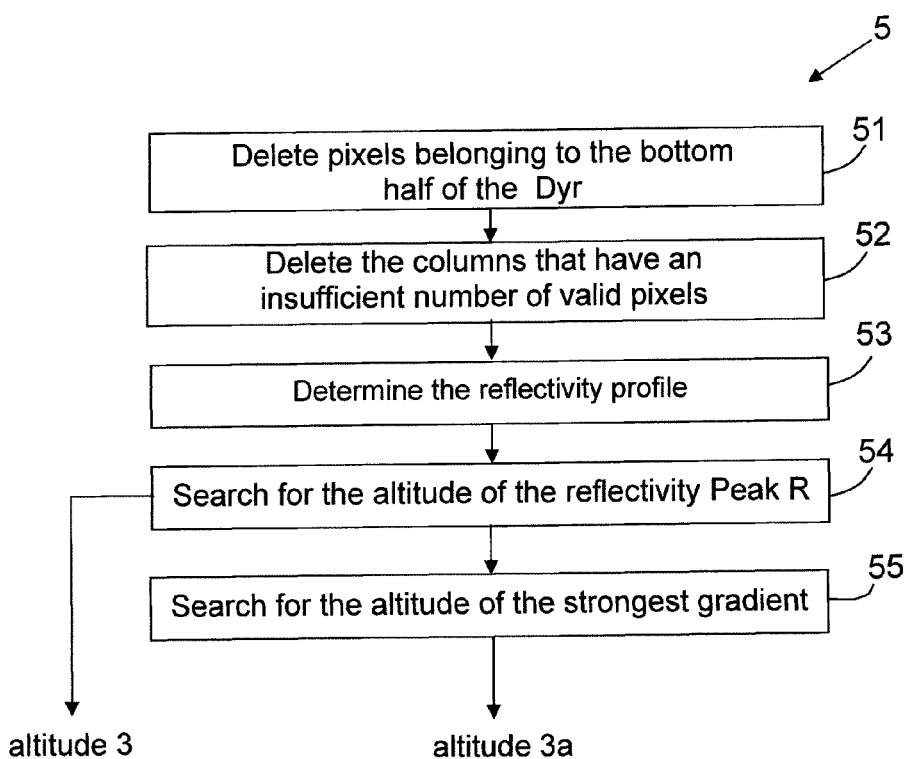
FIGS. 9 and 10 illustrate an exemplary embodiment of a third method of obtaining intermediate values of the altitude of the zero isotherm.

FIG. 9 illustrates another method, referenced method 3, of determining an intermediate value of the altitude of the zero isotherm. This method is notably based on the analysis of the average vertical reflectivity profile of the vertical slice concerned.

More specifically, during a first step 51, the pixels of the vertical slice concerned associated with a reflectivity value belonging to the lower half of the reflectivity dynamic range are deleted.

Then, the columns that have too few valid pixels (in this case fewer than $1/10$th of the possible number of pixels per column) are deleted, step 52.

Figure 10:
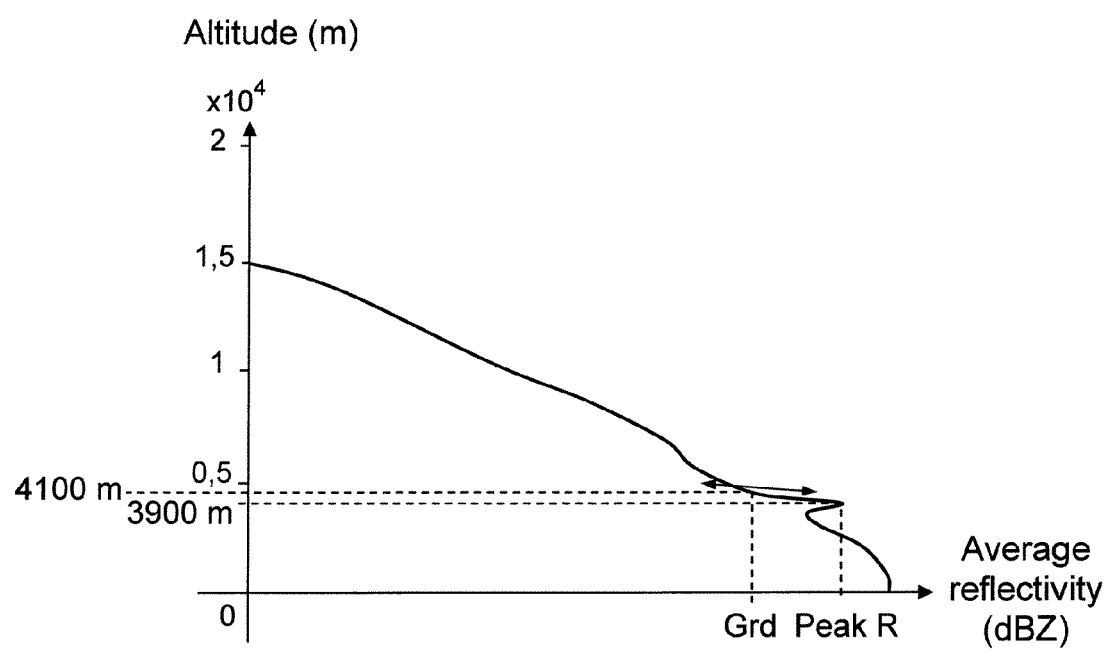

The average vertical reflectivity profile of the vertical slice concerned is then determined, step 53. One example of this type of profile is represented in FIG. 10. The profile is constructed by calculating, for each altitude value, an average of the reflectivity values associated with the pixels located at that altitude. The average reflectivity is expressed in dBZ.

At two very close altitude values, there are a maximum gradient Grd and a reflectivity peak PicR. It is the altitudes that correspond to these two events Grd and PicR that are to be determined using the method referenced method 3.

Referring again to FIG. 9, once the average vertical reflectivity profile is established, the altitude of the reflectivity peak of the established profile is sought, step 54. This altitude constitutes a new intermediate value of the altitude of the zero isotherm, referenced altitude 3.

Finally, the altitude of the strongest gradient of the profile, just above the altitude of the reflectivity peak, is sought, step 55. The latter constitutes another intermediate value of the altitude of the zero isotherm, referenced altitude 3a.

Figure 11:
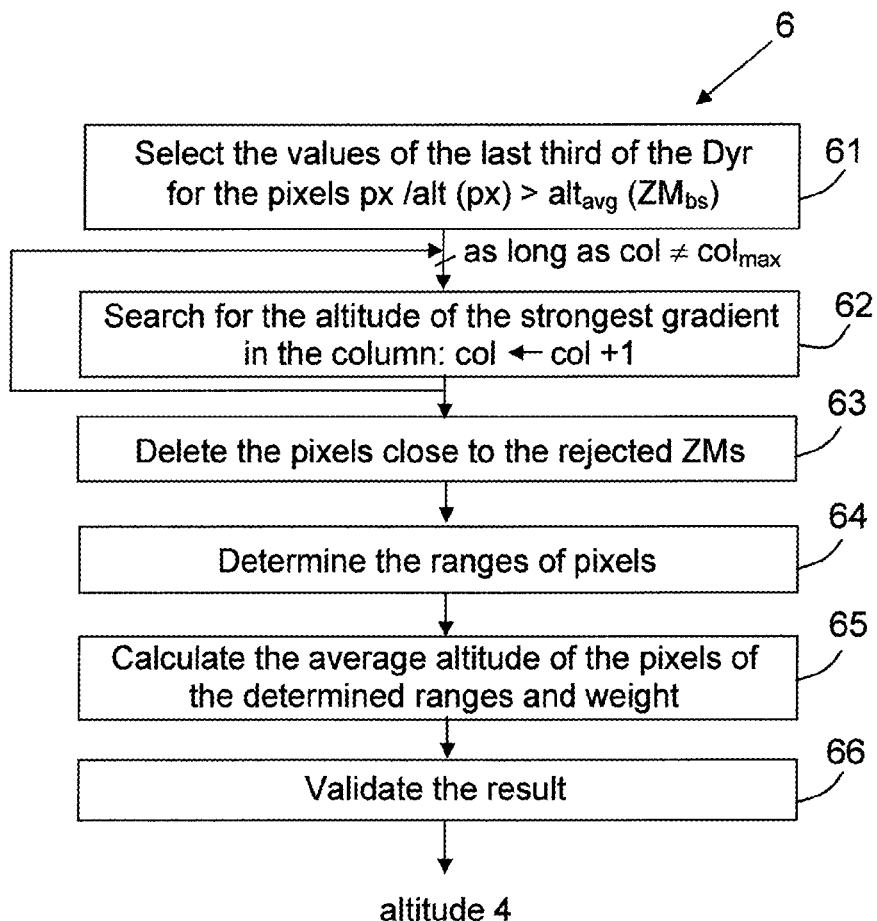
FIGS. 11 and 12 illustrate an exemplary embodiment of a fourth method of obtaining intermediate values of the altitude of the zero isotherm.

Referring now to FIG. 11, the latter illustrates a new method, called method 4, based on the search for the greatest vertical reflectivity gradients within the vertical slice concerned. In effect, the abrupt change of reflectivity values, provoked by the zero isotherm, is characterized by the appearance of a strong reflectivity gradient. Therefore, for this method, method 4, a strong gradient search is performed, one column at a time. To avoid detecting the strong gradients present in the areas of low reflectivity, the search must be limited to a certain interval of values. Wrong detections around areas of strong reflectivity that have previously been detected (step 2) are avoided by fixing a maximum altitude for the search.

More specifically, during a first step, step 61, only the pixels with a reflectivity value that belongs to the last third of the reflectivity dynamic range Dyr of the vertical slice concerned are selected, this being done for the pixels px, such that their altitude is greater than the altitude of the bottom area of maxima $ZM_{bs}$ selected during the step 2.

Then, for each column col and until the final column $col_{max}$ has been processed, the altitude of the strongest gradient of the column is sought.

Figure 12:
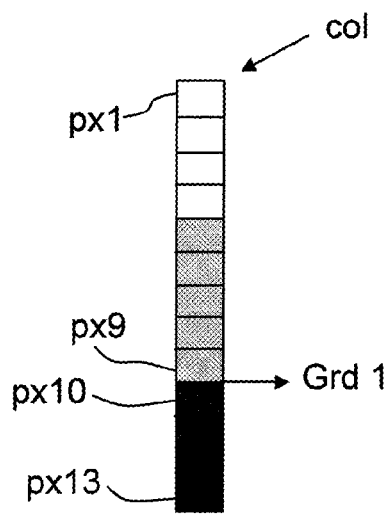

FIG. 12 illustrates an exemplary column col of a vertical slice. The number of pixels represented within the column col is in no way significant: it is here limited to 13 in the interests of simplicity. The pixels 1 to 9, referenced px1 to px9, are associated with a fairly low reflectivity value whereas the pixels 10 to 13, referenced px10 to px13, have a much greater reflectivity value.

The strong reflectivity variation between the pixels px9 and px10 is evidence of the appearance of a reflectivity gradient Grad1.

Referring again to FIG. 11, once the altitudes of the strongest gradients have been found for all the columns, those that are too close to the areas of maxima rejected in the step 2 are deleted, step 63.

Then, the most regular range or ranges of pixels are determined, in the same way as for the method 2, step 64.

The average altitude of the pixels of the range or ranges determined in the preceding step is then calculated, step 65, this calculation being weighted as a function of the distance of the pixels to the radar.

Finally, the result is validated if the number of pixels that have been taken into account is sufficient, step 66. The intermediate value of the altitude of the zero isotherm delivered is referenced altitude 4.

Figure 13:
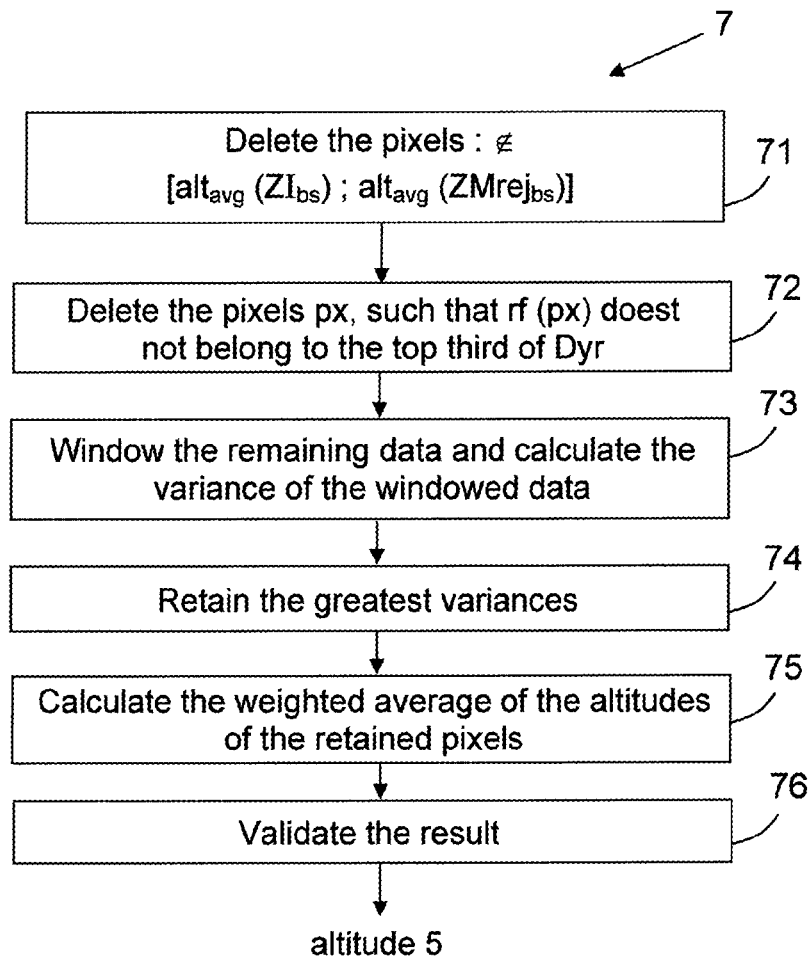
FIG. 13 illustrates an exemplary embodiment of a fifth method of obtaining intermediate values of the altitude of the zero isotherm.

The last method, method 5, used in this embodiment, is represented in FIG. 13.

The latter is based on the search for the places where the variance of the reflectivity values is maximum, to determine the area where the reflectivity values are the least uniform. In effect, the zero isotherm separates two areas with very different average reflectivity values. The uniformity is therefore very low at the point of separation, implying a strong variance.

More specifically, during a first step 71, the pixels that do not belong to the area where the zero isotherm is located are deleted. This area is in this case defined by the average altitude of the lowest rejected area of maxima $ZMre_{jbs}$ and the average altitude of the lowest selected area of maxima, all in the step 2.

Then, the pixels with a reflectivity value that does not belong to the top third of the reflectivity dynamic range Dyr of the vertical slice concerned are deleted, step 72.

The remaining data are then windowed, for example using an analysis window of size [1;5]. The variance of the windowed data is calculated, step 73. In other words, the vertical slice concerned is covered pixel by pixel. The variance of the pixels situated inside the window is calculated. The result is then associated with the central pixel of the window.

The strongest calculated variances are retained, step 74. In this example, the retained variance values are those belonging to the final third of the variance dynamic range.

A weighted average of the altitudes of the pixels associated with the retained variances is then calculated, the weighting here again being a function of the distance of the pixel concerned to the radar, step 75.

Finally, the result is validated if the number of pixels taken into account for the calculation of the average is sufficient, step 76. The value of the intermediate altitude deriving from the method 5 is referenced altitude 5.

Figure 14:
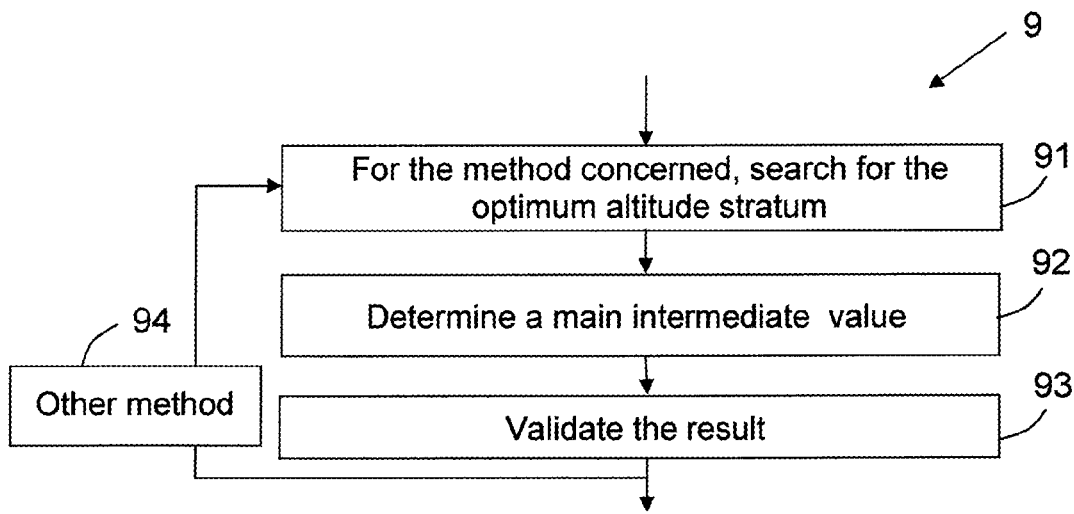
FIG. 14 illustrates an exemplary embodiment of a step for selecting a main intermediate value.
Figure 15:
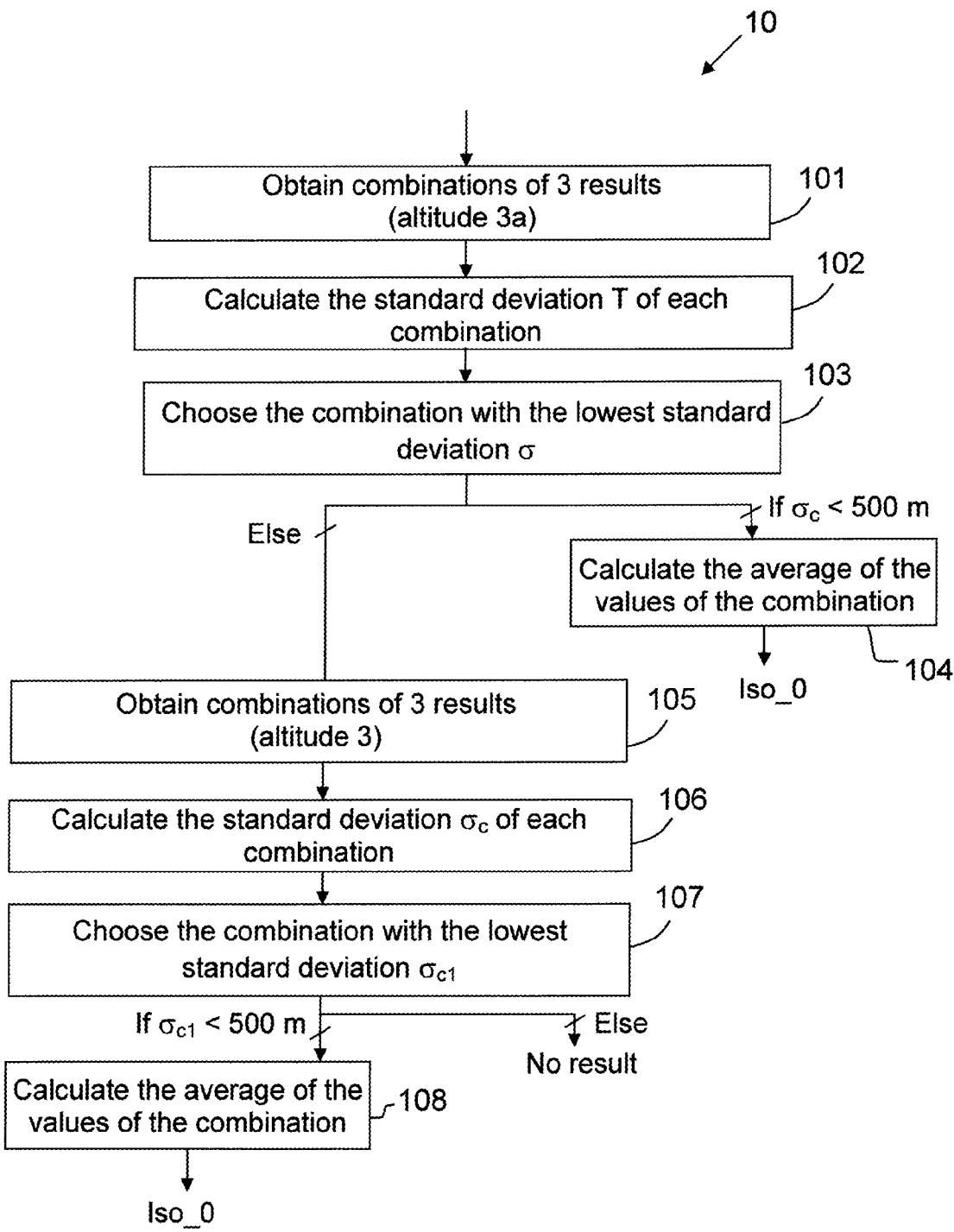
FIG. 15 illustrates an exemplary embodiment of a step for calculating a final result.

When the methods have been applied to all the vertical slices, and the results have been stored, a main intermediate value of the zero altitude is selected for each method, step 9 in FIG. 4. This selection is detailed in FIG. 14.

A first step 91 comprises a selection of an altitude stratum (in this case 1000 m wide) where the most intermediate values are located for a given method, and this is done for each method.

Then, for each result obtained altitude 1, 2, 3, 3a, 4 and 5, a main intermediate value of the altitude of the zero isotherm is determined, step 92. This value here corresponds to the central altitude of the above-mentioned altitude stratum, provided that the number of intermediate values of the zero altitude is sufficient. In this example, the chosen threshold is equal to 25% of all the possible intermediate values. If this condition is satisfied, the result is validated, step 93.

Once the main value has been calculated for a given result, the next result is selected, step 94, and this continues until all the results have been processed.

The altitude of the zero isotherm is ultimately calculated from the abovementioned main intermediate values, step 10 of FIG. 4.

For this, all the possible combinations are made of three results out of the five results that are the main intermediate values of the results: altitude 1, 2, 3a, 4 and 5, step 101. The altitude 3 result is for the time being put to one side.

The standard deviation $\sigma$ of each combination is then calculated, step 102. Then, the combination that has the lowest standard deviation is chosen, step 103. If the chosen standard deviation $\sigma_c$ is less than 500 m, the average of the main intermediate values of the combination corresponding to the chosen standard deviation is calculated. This average corresponds to the altitude of the zero isotherm Iso 0 sought. The method is finished.

However, if the standard deviation $\sigma_c$ is greater than 500 m, then all the possible combinations are made of three results out of the five results that are the main intermediate values of the results: altitude 1, 2, 3, 4 and 5. The altitude 3a result is in this case placed to one side, step 105.

As previously, the standard deviation $\sigma$ of each combination is then calculated, step 106. The combination that has the lowest standard deviation is then chosen, step 107. If the chosen standard deviation $\sigma_{c1}$ is less than 500 m, the average of the main intermediate values of the associated combination is calculated. This average corresponds to the altitude of the zero isotherm Iso 0 sought. Otherwise, it is assumed that the measurements obtained are not sufficiently precise to provide a result for the altitude of the zero isotherm.

Obviously, the values of all the thresholds mentioned hereinabove are given purely as an indication. The latter can be adjusted according to the flying latitude of the airplane, the current season or even the geographic area where the airplane is located.

Moreover, it is possible to take account of the time trend of the value of the altitude of the zero isotherm, to determine each new value.

As a variant, it is advantageous to take account of a priori information for the automatic evaluation of the altitude of the zero isotherm. This information (outside temperature, weather bulletin) can be sent by a ground base during the flight of the airplane or even downloaded before departure.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of processing a radar image, said method comprising the steps of:
   transmitting data from a radar;
   acquiring the radar image from said data;
   automatically evaluating an altitude of a zero isotherm, the evaluation comprising processing reflectivity information conveyed by pixels forming all or part of the radar image, the processing of the reflectivity information comprising generating at least two intermediate values of the altitude of the zero isotherm, from variations in the reflectivity information within the radar image, a value of the altitude of the zero isotherm being a function of the intermediate values, wherein
   the radar image has N vertical slices,
   the processing of the reflectivity information is performed on each vertical slice, one after the other,
   the zero isotherm is an isotherm at zero degrees Celsius, and
   the processing of the reflectivity information further comprises:
      for each vertical slice of the radar image, applying at least two distinct methods of processing of the reflectivity information to obtain the at least two intermediate values of the altitude of the zero isotherm; and
      generating for each of at least two distinct methods and for all the vertical slices, at least one main intermediate value of the altitude of the zero isotherm, from a selected set of intermediate values of the altitude of the zero isotherm, wherein the value of the altitude of the zero isotherm is evaluated from the main intermediate values of the altitude of the zero isotherm.

2. The method according to claim 1, further comprising:
   determining at least three main intermediate values of the altitude of the zero isotherm;
   combining at least two main intermediate values out of the main intermediate values to form one or more combination values;
   calculating the standard deviation of each combination value;
   selecting the combination value with the lowest standard deviation; and
   calculating an average of the main intermediate values of the selected combination to determined the altitude of the zero isotherm, if the standard deviation of the selected combination is less than a given threshold.

3. The method according to claim 2, further comprising, for each vertical slice of the radar image, searching for areas of interest indicated by pixels conveying reflectivity information greater than a given threshold; and
   the processing of the reflectivity information being performed on the areas of interest of the vertical slices.

4. The method according to claim 3, in which a first distinct method comprises, for each vertical slice:
   calculating the average altitude of each upper boundary of each area of interest of the vertical slice concerned; and
   generating a first intermediate value of the altitude of the zero isotherm, by calculating a weighted average of the calculated average altitudes, the weighting being a function of the distance of the area of interest concerned from the radar.

5. The method according to claim 4, in which a second distinct method comprises, for each vertical slice:
   determining a histogram representing the number of pixels of the vertical slice concerned for each reflectivity value;
   determining two peaks corresponding to two maxima of numbers of pixels for two distinct reflectivity values;
   determining a location of a minimum of pixels between the two determined peaks;
   converting the reflectivity information of the pixels of the vertical slice, as a function of the value of the located minimum, to binary format;
   storing the pixels belonging to the boundary between the two areas of the vertical slice concerned;
   deleting the stored pixels that are too distant from the areas of interest;
   determining ranges of pixels formed by a number of consecutive pixels greater than a given threshold;
   generating a second intermediate value of the altitude of the zero isotherm, corresponding to an average of the altitude associated with the pixels of the determined ranges while applying a linear weighting to the altitudes of the pixels, as a function of the distance of the pixel concerned relative to the radar; and
   validating the second intermediate value of the altitude of the zero isotherm, if the total number of pixels out of all the ranges is greater than a given threshold.

6. The method according to claim 5, in which a third distinct method comprises, for each vertical slice:
   deleting pixels with a reflectivity value that belongs to a chosen interval, the other pixels being considered to be valid;
   deleting columns of pixels that have a number of valid pixels less than a given threshold;
   determining an average reflectivity profile of the vertical slice concerned, the profile representing, for each row of valid pixels, an average of the reflectivity values of the pixels of the row;
   searching for a third intermediate value of the altitude of the zero isotherm, corresponding to the altitude associated with the pixel located on a reflectivity peak; and
   searching for another intermediate value of the altitude of the zero isotherm, corresponding to the altitude represented by the pixel situated at the position of the strongest reflectivity gradient.

7. The method according to claim 6, in which a fourth distinct method comprises, for each vertical slice:
   selecting the pixels with a reflectivity information value that belongs to a chosen interval;
   for each column of the vertical slice concerned, searching for the altitude of a maximum reflectivity gradient and storing the pixels situated at the altitude of the gradient;
   deleting the stored pixels that are too distant from the areas of interest;
   determining ranges of pixels, each range being formed by a number of consecutive pixels greater than a given threshold;
   calculating a fourth intermediate value of the altitude of the zero isotherm, corresponding to an average of the altitude associated with the pixels of the ranges determined by calculating a linear weighting on the altitudes of the pixels, as a function of the distance of the pixel concerned relative to the radar; and
   validating the value of the fourth intermediate value of the altitude of the zero isotherm, if the total number of pixels out of all the ranges is greater than a given threshold.

8. The method according to claim 7, in which a fifth distinct method comprises, for each vertical slice:
   deleting the pixels that are too distant from the areas of interest;

deleting the pixels with a reflectivity value that does not belong to a chosen interval;

for each remaining pixel, calculating a variance of the associated reflectivity value;

retaining the variance values that are greater than a given threshold;

calculating a fifth intermediate value of the altitude of the zero isotherm, corresponding to an average of the altitude of the selected pixels, by applying a linear weighting to the altitudes of the pixels, as a function of the distance of the pixel concerned relative to the radar; and validating the value of the fifth intermediate value of the altitude of the zero isotherm, if the total number of pixels selected is greater than a given threshold.

9. The method according to claim 5, in which a fourth distinct method comprises, for each vertical slice:

selecting the pixels with a reflectivity information value that belongs to a chosen interval;

for each column of the vertical slice concerned, searching for the altitude of a maximum reflectivity gradient and storing the pixels situated at the altitude of the gradient;

deleting the stored pixels that are too distant from the areas of interest;

determining ranges of pixels, each range being formed by a number of consecutive pixels greater than a given threshold;

calculating a fourth intermediate value of the altitude of the zero isotherm, corresponding to an average of the altitude associated with the pixels of the ranges determined by calculating a linear weighting on the altitudes associated with the pixels, as a function of the distance of the pixel concerned relative to the radar; and validating the value of the fourth intermediate value of the altitude of the zero isotherm, if the total number of pixels out of all the ranges is greater than a given threshold.

10. The method according to claim 4, in which a third distinct method comprises, for each vertical slice:

deleting the pixels with a reflectivity value that belongs to a chosen interval, the other pixels being considered to be valid;

deleting the columns of pixels that have a number of valid pixels less than a given threshold;

determining an average reflectivity profile of the vertical slice concerned, the profile representing, for each row of valid pixels, an average of the reflectivity values of the pixels of the row;

searching for a third intermediate value of the altitude of the zero isotherm, corresponding to the altitude associated with a pixel located on a reflectivity peak; and searching for another intermediate value of the altitude of the zero isotherm corresponding to the altitude associated with a pixel situated at a position of the strongest reflectivity gradient.

11. The method according to claim 4, in which a fourth distinct method comprises, for each vertical slice:

selecting the pixels with a reflectivity information value that belongs to a chosen interval;

for each column of the vertical slice concerned, searching for the altitude of a maximum reflectivity gradient and storing the pixels situated at the altitude of the gradient;

deleting the stored pixels that are too distant from the areas of interest;

determining ranges of pixels, each range being formed by a number of consecutive pixels greater than a given threshold;

calculating a fourth intermediate value of the altitude of the zero isotherm, corresponding to an average of the altitude associated with the pixels of the ranges determined by calculating a linear weighting on the altitudes associated with the pixels, as a function of the distance of the pixel concerned relative to the radar; and validating the value of the fourth intermediate value of the altitude of the zero isotherm, if the total number of pixels out of all the ranges is greater than a given threshold.

12. The method according to claim 4, in which a fifth distinct method comprises, for each vertical slice:

deleting the pixels that are too distant from the areas of interest;

deleting the pixels with a reflectivity value that does not belong to a chosen interval;

for each remaining pixel, calculating a variance of the associated reflectivity value;

a retention of the variance values that are greater than a given threshold;

calculating a fifth intermediate value of the altitude of the zero isotherm, corresponding to an average of the altitude of the selected pixels, by applying a linear weighting to the altitudes of the pixels, as a function of a distance of the pixel concerned relative to the radar; and validating the value of the fifth intermediate value of the altitude of the zero isotherm, if the total number of pixels selected is greater than a given threshold.

13. The method according to claim 3, in which a second distinct method comprises, for each vertical slice:

determining a histogram representing the number of pixels of the vertical slice concerned for each reflectivity value;

determining two peaks corresponding to two maxima of numbers of pixels for two distinct reflectivity values;

determining a location of a minimum of pixels between the two determined peaks;

converting the reflectivity information of the pixels of the vertical slice, as a function of the value of the located minimum, to binary format;

storing the pixels belonging to a boundary between the two maxima of the vertical slice concerned;

deleting the stored pixels that are too distant from the areas of interest;

determining ranges of pixels formed by a number of consecutive pixels greater than a given threshold;

generating a second intermediate value of the altitude of the zero isotherm, corresponding to an average of the altitude associated with the pixels of the determined ranges while applying a linear weighting to the altitudes of the pixels, as a function of a distance of the pixel concerned relative to the radar; and validating the second intermediate value of the altitude of the zero isotherm, if the total number of pixels out of all the ranges is greater than a given threshold.

14. The method according to claim 3, in which a third distinct method comprises, for each vertical slice:

deleting the pixels with a reflectivity value that belongs to a chosen interval, the other pixels being considered to be valid;

deleting columns of pixels that have a number of valid pixels less than a given threshold;

determining an average reflectivity profile of the vertical slice concerned, the profile representing, for each row of valid pixels, an average of the reflectivity values of the pixels of the row;

searching for a third intermediate value of the altitude of the zero isotherm, corresponding to the altitude associated with the pixel located on a reflectivity peak; and searching for another intermediate value of the altitude of the zero isotherm corresponding to the altitude associated with the pixel situated at a position of the strongest reflectivity gradient.

15. The method according to claim 3, in which a fourth distinct method comprises, for each vertical slice:
- selecting the pixels with a reflectivity information value that belongs to a chosen interval;
- for each column of the vertical slice concerned, searching for the altitude of a maximum reflectivity gradient and storing the pixels situated at the altitude of the gradient;
- deleting the stored pixels that are too distant from the areas of interest;
- determining ranges of pixels, each range being formed by a number of consecutive pixels greater than a given threshold;
- calculating a fourth intermediate value of the altitude of the zero isotherm, corresponding to an average of the altitude associated with the pixels of the ranges determined by calculating a linear weighting on the altitudes associated with the pixels, as a function of the distance of the pixel concerned relative to the radar; and
- validating the value of the fourth intermediate value of the altitude of the zero isotherm, if the total number of pixels out of all the ranges is greater than a given threshold.

16. The method according to claim 3, in which a fifth distinct method comprises, for each vertical slice:
- deleting the pixels that are too distant from the areas of interest;
- deleting the pixels with a reflectivity value that does not belong to a chosen interval;
- for each remaining pixel, calculating the variance of the associated reflectivity value;
- a retention of the variance values that are greater than a given threshold;
- calculating a fifth intermediate value of the altitude of the zero isotherm, corresponding to an average of the altitude of the selected pixels, by applying a linear weighting to the altitudes of the pixels, as a function of a distance of the pixel concerned relative to the radar; and
- validating the value of the fifth intermediate value of the altitude of the zero isotherm, if the total number of pixels selected is greater than a given threshold.

17. The method according to claim 1, further comprising, for each vertical slice of the radar image, searching for areas of interest formed by pixels conveying reflectivity information, the value of which is greater than a given threshold, the processing of the information being performed on the areas of interest of the vertical slices.

* * * * *